Nov. 16, 1954          H. E. HELMLE          2,694,581

VERTICALLY ADJUSTABLE VEHICLE FRAME SUSPENSION

Filed June 5, 1951          3 Sheets-Sheet 1

Nov. 16, 1954  H. E. HELMLE  2,694,581
VERTICALLY ADJUSTABLE VEHICLE FRAME SUSPENSION
Filed June 5, 1951  3 Sheets-Sheet 3

HOLD

RAISE

LOWER

FLOAT

Inventor
Hubert E. Helmle
by
Attorney

United States Patent Office 2,694,581
Patented Nov. 16, 1954

2,694,581

VERTICALLY ADJUSTABLE VEHICLE FRAME SUSPENSION

Hubert E. Helmle, Springfield, Ill., assignor to Allis-Chalmers Manufacturing Company, Milwaukee, Wis.

Application June 5, 1951, Serial No. 229,952

6 Claims. (Cl. 280—44)

The invention relates to crawler tractors and similar vehicles in which a pair of swing frames at opposite sides of the vehicle main body are equipped with endless tracks or the like, and in which the swing frames are pivotally connected, independently of each other, with the vehicle main body so as to permit pivotal up and down movement of the main body relative to the swing frames and vertical oscillation of the swing frames relative to each other.

Generally, it is an object of the present invention to provide an improved frame suspension for a vehicle such as a crawler tractor having swing frames at opposite sides of its main body.

A copending application Serial Number 224,717, filed on May 5, 1951, by Charles H. Herr, Jr., for Bulldozer Tractor, and having the same assignee as this application, discloses a crawler tractor in which up and down swinging movement of the tractor main body relative to the track frames is controlled by means of a hydraulic mechanism, and in which a bulldozer blade is rigidly mounted on a forward part of the tractor main body so that pivotal downward movement of the tractor main body under control of the hydraulic mechanism will lower the bulldozer blade into cutting position, and so that pivotal upward movement of the tractor main body by operation of the hydraulic mechanism will raise the bulldozer blade to transport position.

A more specific object of this invention is to provide an improved frame suspension for a vehicle such as the bulldozer tractor disclosed in the hereinabove mentioned copending application, and which incorporates a mechanism for pivotally raising and lowering the vehicle main body relative to a pair of swing frames at the will of the operator.

Another object of the invention is to provide a vehicle of the hereinabove outlined character in which the swing frames are capable of relative swinging movements in opposite directions not only when the vehicle main body occupies an intermediate substantially horizontal position but also when the vehicle main body occupies a position of maximum upward or downward adjustment from such intermediate position.

A further object of the invention is to provide a vehicle having a main body and a pair of swing frames, as outlined hereinbefore, and an improved adjusting mechanism for the vehicle main body including a pair of vertically swingable side levers which are pivoted on the vehicle main body and cooperate with the swing frames so that downward swinging movement of the vehicle main body relative to the swing frames will cause upward swinging movement of the side levers on the vehicle main body in relatively reversed directions, and so that downward swinging movement of the side levers on the vehicle main body in relatively reversed directions will cause upward swinging movement of the vehicle main body relative to the swing frames.

A further object of the invention is to provide a vehicle having side levers arranged as outlined hereinbefore for relatively reversed swinging movements on the vehicle body and an actuating mechanism for the side levers which is selectively operable to either prevent or permit relatively reversed upward swinging movements or to effect relatively reversed downward swinging movements of the side levers, or to interconnect the side levers for unidirectional swinging movement relative to the vehicle main body.

A still further object of the invention is to provide a vehicle having side levers and an actuating mechanism therefor as outlined hereinabove, and an auxiliary mechanism which will be operable independently of the mentioned actuating mechanism to secure the vehicle main body against pivotal downward movement relative to the swing frames.

A further object of the invention is to provide a vehicle having a main body and a pair of swing frames as outlined hereinbefore, and an improved adjusting mechanism which will be operable to pivotally raise and lower the vehicle main body without setting up objectionable twisting strains in the swing frames, that is, strains which tend to tilt the swing frames laterally toward or away from the vehicle main body.

These and other objects and advantages are attained by the present invention, various novel features of which will be apparent from the description herein and accompanying drawings disclosing an embodiment of the invention, and will be more particularly pointed out in the appended claims.

Figure 1:
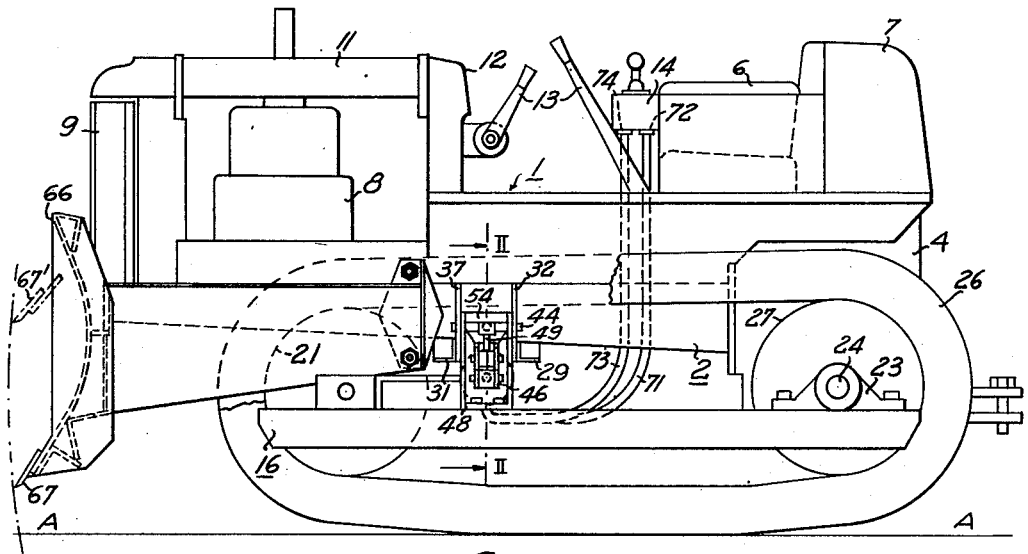
Fig. 1 is a side view of a bulldozer tractor embodying the invention.
Figure 2:
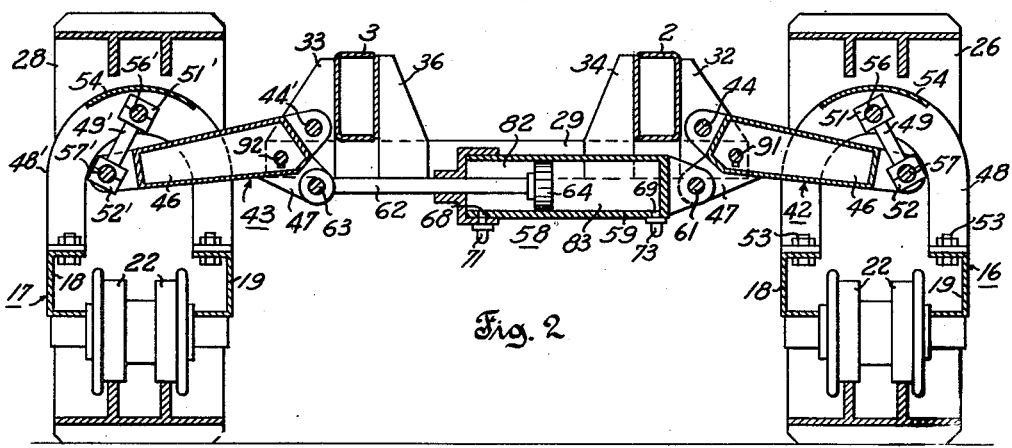
Fig. 2 is an enlarged sectional view on line II—II of Fig. 1 and shows a hydraulically controlled equalizer mechanism between the main body and the swing frames of the tractor, the equalizer mechanism as shown in Fig. 2 being adjusted to a condition in which it is effective to sustain the tractor main body in a horizontal position while both track units rest on level ground.

Referring to Figs. 1 and 2, a tractor main body generally designated by the reference character 1 comprises a pair of parallel, transversely spaced side members 2 and 3, and a conventional rearward steering clutch and final drive housing 4. An operator's seat 6 and a fuel tank 7 are mounted on top of the housing 4, and a propelling engine 8, radiator unit 9, bonnet 11, and dash panel 12 are mounted forwardly of the operator's seat, all in conformity with well established principles of crawler tractor design. Conventional tractor controls are shown at 13, and a hydraulic control valve 14, which will be more fully explained hereinbelow, is suitably mounted within convenient reach from the operator's seat 6.

A swing frame 16 is pivotally connected with and extends longitudinally at the left side of the tractor main body 1, as shown in Figs. 1 and 2, and another swing frame, generally designated by the reference character 17 in Fig. 2, is similarly connected with and extends longitudinally at the right side of the tractor main body 1, the terms left and right being used in conformity with the orientation of an operator who occupies a forwardly facing position on the seat 6. The swing frames 16 and 17 each comprise a pair of inner and outer side channels 18 and 19 which are rigidly interconnected in transversely spaced relation to each other, and mounted on each pair of side channels in conventional manner are a front idler 21 and a series of track rollers 22. A rearward outboard bearing 23 shown in Fig. 1 is mounted on the outer side channel 19 of the track frame 16 for the reception of a shaft 24 which is mounted on the housing 4 of the tractor main body, and an inboard bearing, not shown, is preferably provided in conformity with conventional practice to connect the left track frame 16 with the tractor main body 1 for pivotal up and down movement on the axis of the shaft 24. The right track frame 17 is pivotally connected with the tractor main body on the same axis as but independently of the left track frame 16, and to that end the right track frame 17 is provided with outboard and inboard bearings, not shown, the same as the track frame 16. An endless track belt 26 at the left side of the tractor is conventionally arranged for cooperative engagement with the front idler 21 and track rollers 22 of the swing frame 16 and with a track belt drive sprocket 27 which is rotatably mounted on the tractor main body coaxially with the shaft 24. Another endless track belt generally designated by the reference character 28 in Fig. 2, is similarly arranged at the right side of the tractor for cooperative engagement with the front idler and track rollers of the swing frame 17 and with another track belt drive sprocket, not shown, corresponding to and coaxial with the track belt drive sprocket 27.

Figure 3:
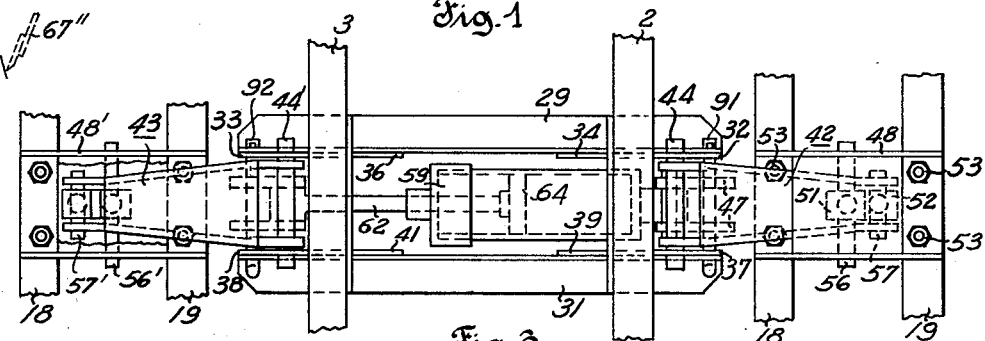
Fig. 3 is a top view of the parts shown in Fig. 2, with the track belts omitted for purposes of exposure.

Referring to Figs. 2 and 3, a pair of rearward and forward angle irons 29 and 31 are secured, as by welding, to the side members 2 and 3 of the tractor main body in transversely extending relation to the latter, both of these angle irons being located well forward of the pivot axis on which the swing frames 16 and 17 are connected with the tractor main body, as best shown in Fig. 1. One end portion of each angle iron extends laterally outward from the side member 2 at the left side of the tractor, and another end portion of each angle iron extends laterally outward from the side member 3 at the right side of the tractor. The rearward angle iron 29 has a vertical flange set on edge against the under sides of the side members 2 and 3, and a horizontal flange which extends rearwardly from the lower end of the vertical flange. A vertical wing plate 32 at the laterally outer side of the side member 2 is placed face to face with the vertical flange of the rearward angle iron 29 at the forward side of the latter and extends upwardly approximately to the top of the side member 2, as best shown in Fig. 2. Another wing plate 33, corresponding to the wing plate 32, is similarly arranged in face to face relation with the forward side of the vertical flange of the angle iron 29 at the laterally outer side of the side member 3 of the tractor main body. The wing plates 32 and 33 are preferably secured in position by welded connections with the side members 2 and 3 and with the rearward angle iron 29. For reinforcing purposes, the vertical flange of the angle iron 29 is further connected with the side members 2 and 3 by a pair of gusset plates 34 and 36 which are set on edge against the laterally inner sides of the side members 2 and 3, respectively. Like the wing plates 32 and 33, the gusset plates 34 and 36 are placed face to face with the forward side of the vertical flange of the angle iron 29, and the gusset plates are secured in position by welded connections with the angle iron 29 and with side members 2 and 3, respectively.

The forward angle iron 31 has a vertical flange which, like the vertical flange of the angle iron 29 is set on edge against the under sides of the side members 2 and 3, and a horizontal flange which extends forwardly from the lower end of the vertical flange. The explanations hereinbefore with respect to the connections of the rearward angle iron 29 with the side members 2 and 3 of the tractor main body similarly apply to the connections of the forward angle iron 31 and the side members 2 and 3. As shown in Fig. 3, two vertical wing plates 37 and 38, opposite and corresponding to the wing plates 32 and 33, are set on edge against the laterally outer sides, respectively, of the side members 2 and 3 at the rear side of the vertical flange of the front angle iron 31, and two vertical gusset plates 39 and 41, opposite and corresponding to the gusset plates 34 and 36, are set on edge, at the rear side of the vertical flange of the angle iron 31, against the laterally inner sides of the side members 2 and 3, respectively. The wing and gusset plates 37 and 39 are secured in position by welded connections with side member 2 and front angle iron 31, and the wing and gusset plates 38 and 41 are secured in position by welded connections with the side member 3 and the angle iron 31.

A pair of side levers 42 and 43 are mounted, as best shown in Figs. 2 and 3, at the opposite sides of the tractor main body for swinging movement transversely of a plane which extends at right angle to the axis of shaft 24, that is the axis on which the swing frames 16 and 17 are swingable relative to the tractor main body. The side lever 42 at the left side of the tractor has a radially inner end between the rearward and forward wing plates 32 and 37, and a pivot pin 44 extends in the longitudinal direction of the side member 2 through the wing plates 37 and through the side lever 42 so as to mount the side lever for swinging movement on the axis of the pivot pin 44 relative to the tractor main body. The side lever 42 has a relatively long load transmitting arm 46 and a relatively short actuating arm 47 in angular and downwardly extending relation to the load transmitting arm 46. As shown in Figs. 2 and 3, the load transmitting arm 46 extends laterally outward from the tractor main body over the swing frame 16, and the radially outer part of the lever is reduced in height and width relative to the radially inner part, the arm being hollow and having radially outward converging side, top and bottom walls. The actuating arm 47 of the side lever 42 is formed by two prongs which are connected with and extend obliquely from the bottom wall of the load transmitting arm 42, the prongs of the actuating arm being spaced from each other in the longitudinal direction of the side member 2, as indicated in Fig. 3.

The radially outer end of the load transmitting arm 46 of the side lever 42 is connected in load transmitting relation with the swing frame 16 by means of an upwardly arched hanger bracket 48 and a link 49 which is swingably suspended from the hanger bracket by means of a ball and socket joint 51. At its lower end, the link 49 is swingably connected with the radially outer end of the load transmitting arm 46 by means of a ball and socket joint 52. The hanger bracket 48 comprises a pair of U-shaped front and rear sections which are secured in inverted positions on the side channels 18 and 19 of the swing frame 16 by fastening bolts and nuts collectively designated by the reference character 53. At the upper end of the hanger bracket 48, its inverted U-shaped front and rear sections are connected together by an arched web 54, and a supporting pin 56 for the ball and socket joint 51 is mounted at its opposite ends on the front and rear sections of the hanger bracket 48 below the arched web 54. The ball and socket joint 52 at the lower end of the link 49 is mounted on a supporting pin 57 which extends through a bifurcated portion at the radially outer end of the load transmitting arm 46.

The foregoing explanations with respect to the construction, mounting and arrangement of the side lever 42 at the left side of the tractor, analogously apply to the construction, mounting and arrangement of the side lever 43 at the right side of the tractor. A pivot pin 44' corresponding to the pivot pin 44, mounts the side lever 43 between the wing plates 33 and 38 for swinging movement transversely of the mentioned plane which extends at right angles to the rearward pivot axis of the swing frames 16 and 17, and the side lever 43, like the side lever 42, has a relatively long load transmitting arm 46 and a relatively short actuating arm in downwardly and angularly extending relation to the load transmitting arm 46. A hanger bracket 48' is rigidly mounted on the swing frame 17, and a link 49' corresponding to the link 49, is universally connected at its upper end by a ball and socket joint 51' with the hanger bracket 48', and at its lower end the link 49' is universally connected by a ball and socket joint 52' with the bifurcated radially outer end of the load transmitting arm 46 which extends laterally outward from the tractor main body over the swing frame 17. Supporting pins 56' and 57' for the ball and socket joints 51' and 52' at the right side of the tractor correspond, respectively, to the supporting pins 56 and 57 at the left side of the tractor.

A double acting hydraulic jack 58 at the underside of the tractor main body comprises a cylinder 59 which is pivoted by means of wrist pin 61 on the free end of the bifurcated actuating arm 47 of the side lever 42, a piston rod 62 which is pivoted by means of a wrist pin 63 on the free end of the actuating arm 47 of the side lever 43, and a piston 64 which is secured to the piston rod 62 and reciprocable within the cylinder 59 by admission of pressure fluid alternately at one side or the other of the piston 64. Accordingly, there is provided a servomotor in the form of a hydraulic jack 58 which comprises a single pair of oppositely movable power output elements, piston 64 and cylinder 59, operatively interconnected in supporting relation to each other. The pivot connections at 61 and 63 between the cylinder 59 and side lever 42 and between the piston rod 62 and the side lever 43, respectively, support the jack 58 in floating relation to the tractor main body, so that the jack may be bodily displaced transversely of the tractor main body without relative displacement of its cylinder 59 and piston 64, as will be more fully discussed hereinbelow.

In the condition of the parts as shown in Figs. 2 and 3, the piston 64 occupies an intermediate position within the cylinder 59, which corresponds to a horizontal position of the tractor main body as shown in Fig. 1. A bulldozer blade 66 extends transversely across the front end of the tractor main body and is rigidly connected with the side members 2 and 3 for up and down swinging movement in unison with the tractor main body on the rearward pivot axis at 24 in Fig. 1. The mounting of the bulldozer blade 66 on the tractor main body is the same as disclosed in the hereinbefore mentioned copending application. A cutting edge 67 of the bulldozer blade 66 is vertically located with respect to the tractor main body so that in the horizontal position of the tractor main body, as shown in Fig. 1, the cutting edge 67 is raised a moderate distance from the horizontal ground level indicated by the line A—A.

Figure 4:
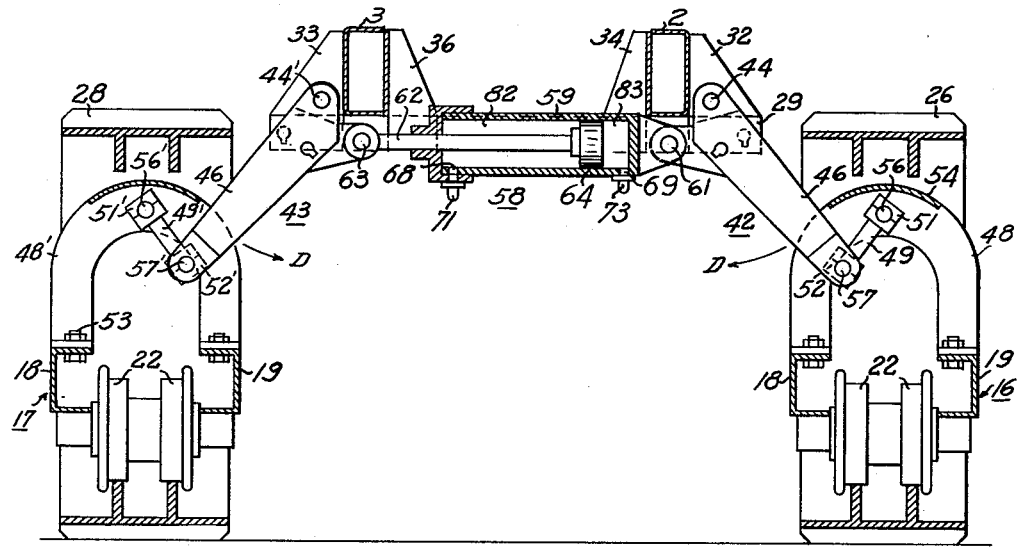
Fig. 4 is a view similar to Fig. 2 but showing the equalizer mechanism adjusted to a condition in which it is effective to sustain the tractor main body in a position of maximum pivotal upward adjustment while both track units rest on level ground.

In Fig. 4, the jack 58 is shown in a condition of maximum contraction in which the piston 64 occupies a main body raised position adjacent to the end of the jack which is connected with the side lever 42. The condition of the parts shown in Fig. 4 corresponds to a pivotally upward adjusted position of the tractor main body on its rearward pivot axis at 24, in which the cutting edge 67 of the bulldozer blade is raised a maximum distance from the horizontal ground level A—A, as indicated by the dotted line position 67' of the bulldozer cutting edge in Fig. 1. Upward pivotal adjustment of the tractor main body from the position illustrated by Fig. 2 to the position illustrated by Fig. 4 is effected by downward swinging movement of the load transmitting arms 46 of the side levers 42, 43 on the tractor main body in relatively reversed directions, as indicated by the arrows D, D in Fig. 4.

Figure 5:
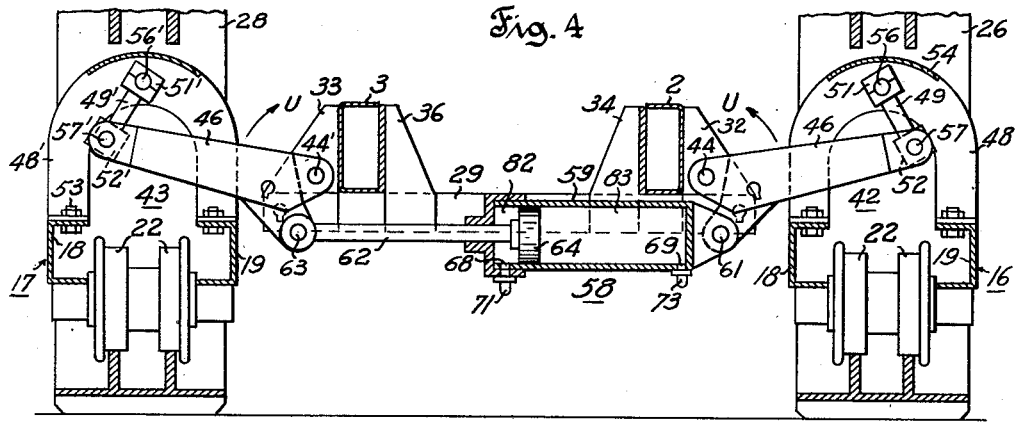
Fig. 5 is a view similar to Fig. 2 but showing the equalizer mechanism adjusted to a condition in which it is effective to sustain the tractor main body in a position of maximum pivotal downward adjustment while both track units rest on level ground.

In Fig. 5, the jack 58 is shown in a condition of maximum expansion in which the piston 64 occupies a main body lowered position adjacent to the end of the jack which is connected with the side lever 43. The condition of the parts shown in Fig. 5 corresponds to a pivotally downward adjusted position of the tractor main body on its rearward pivot axis at 24, in which the cutting edge 67 of the bulldozer blade is lowered to a maximum depth below the horizontal ground level A—A, as indicated by the dotted line position 67" of the bulldozer cutting edge in Fig. 1. Downward swinging movement of the tractor main body on its rearward pivot axis at 24 causes simultaneous upward swinging movement of the arms 46 of the side levers 42, 43 on the tractor main body in relatively reversed directions as indicated by the arrows U, U in Fig. 5.

The cylinder 59 of the hydraulic jack 58 has a first port 68 at the end at which the piston 64 is located in its main body lowered position (Fig. 5), and a second port 69 at the end at which the piston 64 is located in its main body raised position (Fig. 4). The first port 68 of the jack cylinder 58 is connected by a conduit 71 with a first discharge port 72 of the hereinbefore mentioned hydraulic control valve 14, and the second cylinder port 69 is connected by a conduit 73 with a second discharge port 74 of the valve mechanism 14.

Figure 7:
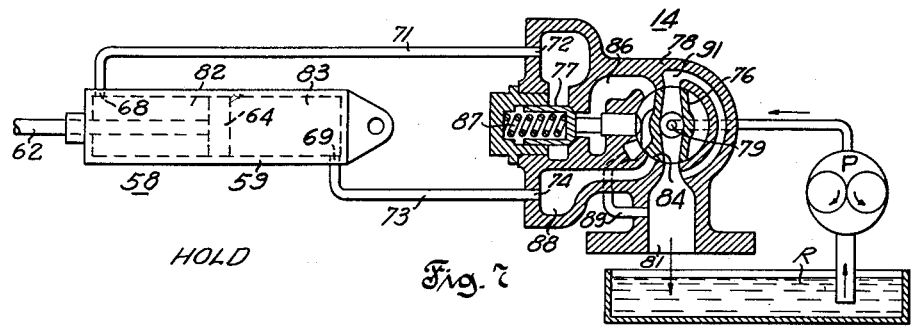
Figs. 7 to 10, inclusive, are diagrammatic views of a hydraulic system incorporated in the tractor bulldozer shown in Fig. 1.

The conduits 71 and 73 and the valve mechanism 14 are part of a hydraulic system which is diagrammatically illustrated in various operating conditions by Figs. 7 to 10, inclusive. Referring to Fig. 7, the hydraulic system is supplied with pressure fluid by a pump P which is driven by the tractor engine 8 in any suitable manner (not shown), and at its inlet or suction side the pump P draws a suitable liquid, such as oil, from a reservoir R which is suitably mounted on the tractor in association with the valve 14 in conventional manner. The valve mechanism 14 is of well known construction which is commonly used in connection with hydraulically operated tractor equipment, such as bulldozers. As diagrammatically indicated in Fig. 7, a rotatable valve body 76 and a reciprocable valve body 77 are mounted in a valve housing 78 which, in addition to the mentioned first and second discharge ports 72 and 74, has an inlet port 79 in communication with the discharge side of the pump P, and an outlet port 81 in communication with the reservoir R.

Fig. 7 shows the hydraulic system in a "Hold" condition in which the discharge of the pump P is directed through the rotatable valve body 76 directly into the outlet port 81 and reservoir R, while escape of fluid from the cylinder space 83 in communication with the port 69 is prevented by a land 84 of the rotatable valve body 76. In the "Hold" position of the hydraulic system, as shown in Fig. 7, the tractor main body 1 together with the bulldozer blade 66 are prevented from downward swinging movement on the rearward pivot axis at 24 and also from upward swinging movement on said axis, but the swing frames 16 and 17 are capable of controlled swinging movement, in opposite directions, relative to the tractor main body. Adjustment of the rotary valve body 76 to the "Hold" position shown in Fig. 7, hydraulically locks the piston 64 against back and forth movement axially of the cylinder 58, and as a result, the side levers 42 and 43 will be interconnected for unidirectional swinging movement on their respective pivot centers at 44 and 44' relative to the tractor main body. Under these conditions, upward swinging movement, for instance, of the swing frame 16 from the position in which it is shown in Fig. 2 will force the swing frame 17 to move downwardly an equal amount from the position in which it is shown in said figure, and vice versa. During such controlled relative oscillations of the swing frames, the hydraulic jack 58, in its locked condition, moves bodily toward the side of the tractor main body at which the upwardly swinging track frame is located.

Figure 8:
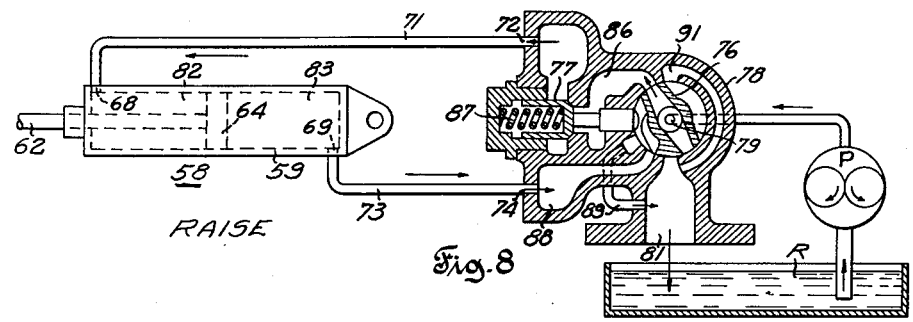

Fig. 8 shows the hydraulic system in a "Raise" condition in which the discharge of pump P is directed through the rotatable valve body 76 into a passage 86 of the valve housing 78, and from which passage the pressure fluid may pass to the discharge port 72 past the reciprocable valve body 77. A coil spring 87 normally tends to force the valve body 77 upon its seat, but yields to the pressure of the pump P to let pressure fluid pass from the passage 86 to the discharge port 72 and from the latter through the conduit 71 into the cylinder space 82 at the left of Figs. 2 and 8. The cylinder space 83 at the right of Figs. 2 and 8 communicates through the conduit 73 and through passages 88 and 89 of the valve housing with the outlet port 81, while the valve mechanism is in the "Raise" position as shown in Fig. 8. Admission of pressure fluid into the cylinder space 82, as shown in Fig. 8, causes upward swinging movement of the tractor main body and bulldozer structure on the rearward pivot axis at 24, as illustrated by Fig. 4, while pressure fluid is being emitted from the cylinder space 83 through the conduit 73 into passage 88 and from the latter past the rotary valve body 76 into passage 89, outlet 81 and reservoir R.

Figure 9:
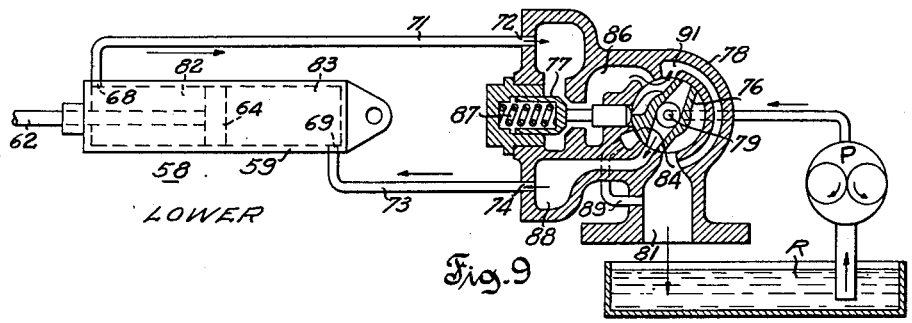

Fig. 9 shows the hydraulic system in a "Lower" condition in which the discharge of the pump P is directed through the rotatable valve body 76 into the passage 88 of the valve housing 78, while the reciprocable valve body 77 is held in an open position by the land 84 of the rotatable valve body 76. As a result, pressure fluid will be admitted into the cylinder space 83, and at the same time pressure fluid will be emitted from the cylinder space 82 through the conduit 71, discharge port 72 and past the valve body 77 into the passage 86 of the valve housing and from the latter, past the valve body 76 into an internal passage 91 of the valve housing, which in turn communicates through the outlet port 81 with the reservoir R. Upon adjustment of the valve mechanism to the condition shown in Fig. 9, the weight of the tractor main body and of the bulldozer structure will no longer be supported by the side levers 42, 43 and the hydraulic jack 58 because the pressure fluid from the cylinder space 82 will freely escape into the reservoir R, as has been explained hereinbefore. Accordingly, the tractor main body will swing downwardly under its own weight and under the weight of the bulldozer structure until the bulldozer cutting edge 67 comes to rest on the ground and prevents further downward movement of the tractor main body and bulldozer structure. Admission of pressure fluid into the cylinder space 83 while the cutting edge 67 rests on the ground will tend to swing the swing frames 16 and 17 upwardly about the transverse rearward pivot axis at 24, and as a result part of the weight of the self-laying track units will be added to the downward load which tends to force the cutting edge 67 into the ground.

Figure 10:
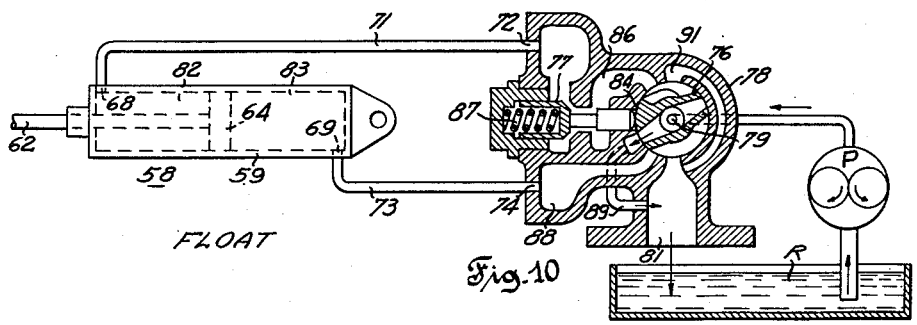

Fig. 10 shows the hydraulic system in a "Float" condition in which the discharge of the pump P is directed through the rotatable valve body 76 and through the passage 89 of the valve housing to the discharge port 81, and in which the cylinder spaces 82 and 83 also communicate with the outlet port 81 of the valve housing 78. As shown in Fig. 10, the reciprocable valve body 77 is kept open by the land 84 of the rotatable valve body 76 and the passage 86 of the valve housing communicates with the passage 91 which in turn communicates with the outlet 81. On the other hand, the passage 88 of the valve housing 78 is placed into communication with the outlet port 81 by adjustment of the rotary valve body 76 to the position in which it is shown in Fig. 10. In the "Float" condition of the hydraulic system, as shown in Fig. 10, the cutting edge 67 of the bulldozer rests on the ground, and the tractor main body and the bulldozer structure may move to any position of pivotal adjustment on the rearward pivot axis at 24 without impediment by the hydraulic jack 58 within the limits of swinging movements of the side levers 42 and 43.

Figure 6:
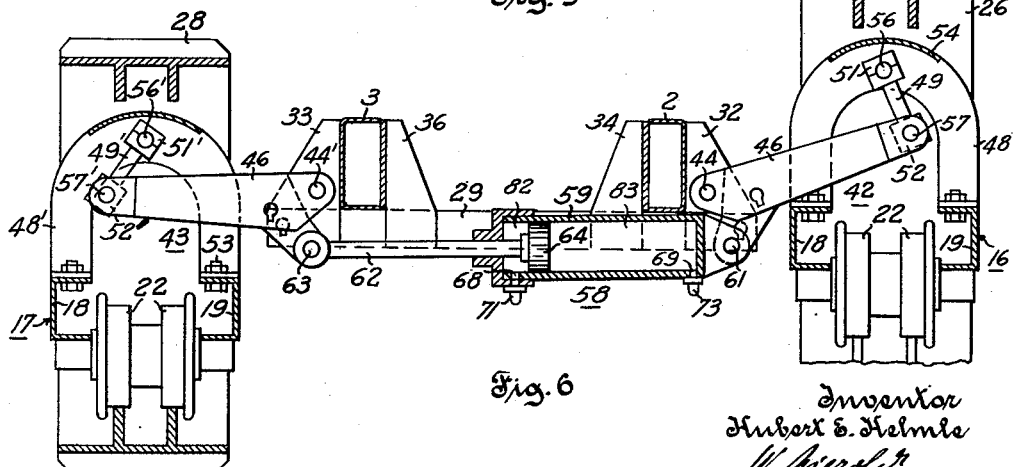
Fig. 6 is a view similar to Fig. 5 but showing the track units vertically displaced in opposite directions from the positions in which they are shown in Fig. 5.

An important feature of the herein disclosed frame suspension resides in the ability of the swing frames 16 and 17 to oscillate in relatively opposite directions in any pivotally adjusted position of the tractor main body on its rearward pivot axis at 24. In connection with Figs. 2 and 7 it has been pointed out hereinbefore that when the hydraulic control system is in its "Hold" condition as shown in Fig. 7, and the tractor main body occupies a horizontal position as shown in Fig. 1, relative swinging movement of the swing frames 16 and 17 will be controlled by operation of the side levers 42, 43 and the hydraulically locked jack 58, so that swinging movement of one swing frame in one direction will force the other swing frame to swing an equal amount in the opposite direction. Fig. 6 illustrates a condition to which the equalizer mechanism between the tractor main body and the swing frames will automatically adjust itself when the tractor is operated with its main body lowered to a maximum downward position and the track unit at the left side of the tractor encounters an obstruction which causes the swing frame 16 to move upwardly from the position in which it is shown in Fig. 5. It is assumed that while the tractor is being operated with its main body adjusted to maximum downward position, as mentioned, the control valve 14 is kept in the "Hold" position in which it is shown in Fig. 7. From a comparison of Fig. 6 with Fig. 5 it will be noted that the axial position of the piston 64 in the cylinder 59 in Fig. 6 is the same as in Fig. 5, but that in Fig. 6 the side lever 42 is swung upwardly from the position in which it is shown in Fig. 5, while the side lever 43 in Fig. 6 is swung downwardly from the position in which it is shown in Fig. 5. Such relative swinging movement of the side levers 42 and 43 is accommodated by bodily movement of the hydraulically locked jack 58 from the position in which it is shown in Fig. 5 to the position in which it is shown in Fig. 6.

The foregoing explanations with respect to the functioning of the equalizer mechanism during operation of the tractor with the main body lowered to maximum downward position similarly apply if the self-laying track unit at the right side encounters an obstruction which causes the swing frame 17 to swing upwardly from the position in which it is shown in Fig. 5. In that case the side lever 43 will swing upward and the side lever 42 will swing downward an equal amount from the positions in which these levers are shown in Fig. 5, and the hydraulically locked jack 58 will be bodily displaced toward the right side of the tractor, that is, toward the left in Fig. 5. On the other hand, if the tractor is operated with its main body adjusted to a position of maximum upward pivotal adjustment as illustrated by Fig. 4, and one or the other of the track units encounters an obstruction while the control valve 14 is in its "Hold" position, the track unit encountering the obstruction will swing upwardly and the other track unit will swing downwardly an equal amount, as will be readily apparent from the foregoing explanations.

Referring again to Figs. 2 and 3, the side levers 42 and 43 are shown in these figures as being secured against swinging movement on the axes of their respective pivot pins 44 and 44' by two locking pins 91 and 92. The locking pin 91 is passed through registering holes in the vertical flanges of the rear and front angle irons 29 and 31 and their associated wing plates 32 and 37, respectively, and through registering holes in the side walls of the load transmitting arm 46 of the side lever 42. These holes have key slots and the pin has a suitable lug which may pass through the key slots and which, upon subsequent rotation of the pin, will secure the pin against axial withdrawal from the angle irons 29 and 31 and from the side lever 42. These explanations with respect to the locking pin 91 for the side lever 42 analogously apply to the locking pin 92 for the side lever 43.

The purpose of the pins 91 and 92 is to sustain the tractor main body against downward swinging movement of its front end at times when no or insufficient hydraulic pressure fluid is available for actuation of the jack 58. Under normal operating conditions such as have been mentioned hereinbefore the pins 91 and 92 are removed from the installed positions in which they are shown in Figs. 2 and 3 so that the side levers 42 and 43 will be free to swing on the axes of their respective pivot pins 44 and 44'.

In the embodiment of the invention which has been selected herein for purposes of illustration, a pair of load transmitting elements, as represented for instance by the wrist pins 61 and 63, are connected, respectively, with the side levers 42 and 43 for movement therewith relative to the tractor main body and in such relation to the pivot centers at 44 and 44' of said levers that said load transmitting elements will be moved relative to each other in one direction upon upward swinging movement of the side levers 42, 43 on the tractor main body, and so that said load transmitting elements will be moved relative to each other in the opposite direction upon downward swinging movement of the side levers relative to the tractor main body. Further, the jack 58 represents a hydraulic servo motor or, more generally, power operated control means associated with the load transmitting elements 61, 63 and selectively operable so as to either restrain or permit relative movement of said load transmitting elements in said one direction or to effect relative movement of said load transmitting elements in said opposite direction.

It should be understood that it is not intended to limit the invention to the particular forms and details described hereinabove and that the invention includes such other forms and modifications as are embraced by the scope of the appended claims.

It is claimed and desired to secure by Letters Patent:

1. In a vehicle having a main body and running gear therefor including a pair of swing frames pivotally connected with and extending longitudinally at opposite sides, respectively, of said main body, the combination of a pair of load transmitting arms having radially inner ends adjacent to and pivotally connected with said main body and radially outer ends extending over and operatively connected with said swing frames, respectively, so that pivotal downward movement of said main body relative to said swing frames will swing said load transmitting arms upwardly on said main body in relatively reversed directions, actuating arms rigidly connected, respectively, with said load transmitting arms and having free ends in such relation to the pivot centers of said load transmitting arms that said free ends of said actuating arms will be moved in relatively opposed directions and transversely of said main body upon said relatively reversed upward swinging movements of said load transmitting arms relative to said main body, a servomotor comprising a single pair of oppositely movable power output elements operatively interconnected in supporting relation to each other, means operatively connecting said power output elements, respectively, with said free ends of said actuating arms independently of said main body, and means for selectively controlling operation of said servomotor so as to either restrain or permit said relatively reversed upward swinging movements of said load transmitting arms relative to said main body, or to effect relatively reversed downward swinging movements of said load transmitting arms relative to said main body.

2. In a vehicle having a main body and running gear therefor including a pair of swing frames pivotally connected with and extending longitudinally at opposite sides, respectively, of said main body, the combination of a pair of load transmitting arms having radially inner ends adjacent to and pivotally connected with said main body and radially outer ends extending over and operatively connected with said swing frames, respectively, so that pivotal movement of said main body relative to said swing frames will swing said load transmitting arms in relatively reversed directions on and transversely of said main body, a pair of actuating arms rigidly connected, respectively, with said load transmitting arms and each having an end portion adapted to move transversely of and in underlying relation to said main body during said swinging movement of said main body relative to said swing frames, and a hydraulic servomotor comprising a pair of cooperating cylinder and piston elements pivotally mounted, respectively, on said end portions of said actuating arms in floating and underlying relation to said main body; and means for selectively controlling operation of said servomotor so as to either restrain or permit upward swinging movement or to effect downward swinging movement of said load transmitting arms relative to said main body.

3. In a vehicle having a main body and running gear therefor including a pair of swing frames pivotally connected with and extending longitudinally at opposite sides, respectively, of said main body, the combination of a pair of load transmitting arms having radially inner ends adjacent to and pivotally connected with said main body and radially outer ends extending over and operatively connected with said swing frames, respectively, so that pivotal downward movement of said main body relative to said swing frames will swing said load transmitting arms upwardly on said main body in relatively reversed directions, actuating arms rigidly connected, respectively, with said load transmitting arms and having free ends in such relation to the pivot centers of said load transmitting arms that said free ends of said actuating arms will be moved in relatively opposed directions and transversely of said main body upon said relatively reversed upward swinging movements of said load transmitting arms relative to said main body, a cylinder enclosing a reciprocable piston and presenting a pair of variable size fluid chambers at opposite sides, respectively, of said piston; a piston rod extending into said cylinder and operatively connected therein with said piston; means pivotally mounting said cylinder on and in supported relation to the free end of one of said actuating arms; other means pivotally mounting said piston rod on and in supported relation to the free end of the other of said actuating arms; and means for selectively controlling the flow of pressure fluid into and out of said fluid chambers so as to either restrain or permit said relatively reversed upward swinging movements of said load transmitting arms or to effect relatively reversed downward swinging movement of said load transmitting arms relative to said main body.

4. A crawler tractor comprising, a main body, a pair of track frames extending longitudinally of and at opposite sides, respectively, of said main body, rearward pivot means connecting said track frames independently of each other with said main body so as to permit pivotal up and down movements of said main body relative to said track frames and vertical swinging movements of said track frames relative to each other, and an equalizer mechanism connecting said main body forwardly of said rearward pivot means in supported and vertically adjustable relation with said track frames, said equalizer mechanism comprising, a pair of side levers pivoted on said main body for swinging movements transversely of a plane extending at right angles to the axis of said rearward pivot means and each having a load transmitting arm in laterally extending relation to said main body and an actuating arm in vertically extending relation to said load transmitting arm; a pair of hanger brackets, one on each of said track frames; a pair of links pivotally connected with and depending from said hanger brackets; and means pivotally connecting said load transmitting arms of said side levers with the lower ends, respectively, of said links; and load transmitting connecting means operatively interposed between said actuating arms in floating relation to said main body.

5. A crawler tractor as set forth in claim 4, and further comprising releasable locking means cooperable with said main body and with said equalizer mechanism so as to secure said main body against pivotal downward movement relative to said track frames.

6. A crawler tractor as set forth in claim 5, in which said releasable locking means comprise a pair of pins cooperable with said main body and with said side levers, respectively, so as to secure said side levers against swinging movement relative to said main body.

References Cited in the file of this patent

UNITED STATES PATENTS

| Number | Name | Date |
|---|---|---|
| 2,013,994 | Schutte | Sept. 10, 1935 |
| 2,223,802 | Heaslet | Dec. 3, 1940 |
| 2,249,356 | Goodman | July 15, 1941 |
| 2,478,389 | Hagenbook | Aug. 9, 1949 |
| 2,495,057 | Dillingham | Jan. 17, 1950 |